United States Patent [19]

Simpson

[11] 3,860,800

[45] Jan. 14, 1975

[54] AUTOMATIC PITCH AXIS CONTROL SYSTEM FOR AIRCRAFT

[75] Inventor: Robert D. Simpson, Bellevue, Wash.

[73] Assignee: The Boeing Company, Seattle, Wash.

[22] Filed: July 2, 1973

[21] Appl. No.: 376,070

Related U.S. Application Data

[62] Division of Ser. No. 264,119, June 19, 1972, abandoned.

[52] U.S. Cl........ 235/150.22, 235/150.2, 244/77 A, 244/77 D
[51] Int. Cl............................ G06g 7/78, G01s 1/18
[58] Field of Search................... 235/150.2, 150.22; 244/77 A, 77 D

[56] References Cited
UNITED STATES PATENTS

| | | |
|---|---|---|
| 3,327,973 | 6/1967 | Kramer et al..................... 244/77 A |
| 3,333,795 | 8/1967 | Hattendorf et al. .............. 244/77 A |
| 3,398,267 | 8/1968 | Hattendorf..................... 235/150.26 |
| 3,652,835 | 3/1972 | Devlin et al. ................. 235/150.22 |
| 3,743,221 | 7/1973 | Lykken et al..................... 244/77 A |

Primary Examiner—Felix D. Gruber
Attorney, Agent, or Firm—Conrad O. Gardner; Glenn Orlob

[57] ABSTRACT

A pitch axis control circuit for use in an aircraft flight control system. The pitch axis control circuit comprises an integrator for providing vertical velocity signals and utilizes ground velocity signal inputs to provide glide slope and flare vertical velocity command signals.

6 Claims, 4 Drawing Figures

AUTOMATIC PITCH AXIS CONTROL SYSTEM FOR AIRCRAFT

This invention relates to signal processing means for providing automatic approach and landing control signals and more particularly relates to an improved system for automatically controlling the pitch axis of an aircraft during an approach and landing sequence.

Prior art systems which fly an aircraft close to the landing runway and thereafter approach that runway and flare out for touchdown utilize either or both signal sources representative of pitch attitude and barometric referenced altitude rate. The utilization of these several signal sources can result in a less reliable system and may introduce undesired performance characteristics in response to environmental disturbances of the aircraft during an approach and landing.

It is accordingly an object of this invention to provide means in a pitch axis control system for providing fine accuracy and increased reliability glide slope and flare-out control signals thereby preventing errors of increased magnitude in the aircraft flight path at extremely low altitudes.

It is a further object of this invention to provide means in a pitch axis control system for updating the glide slope and flare-out control parameters by utilization of signals representative of aircraft ground velocity.

It is yet another object of this invention to provide means in a pitch axis control system for utilizing signals representative of vertical velocity which are independent of barometric vertical velocity signal generating sources.

It is still a further object of this invention to provide means in a pitch axis control system for providing glide slope control signals and flare-out control signals without requiring utilization of switching devices for operating the system in the flare-out maneuver mode.

The above and further objects are achieved in accordance with a preferred embodiment of the invention by utilization in a pitch axis control system of signal processing means defined by expressions implementing one set of control laws for developing glide slope control signals and flare-out control signals.

Other objects, features, and advantages of the present invention will become apparent from the following description in conjunction with the accompanying drawings in which.

Figure 1:
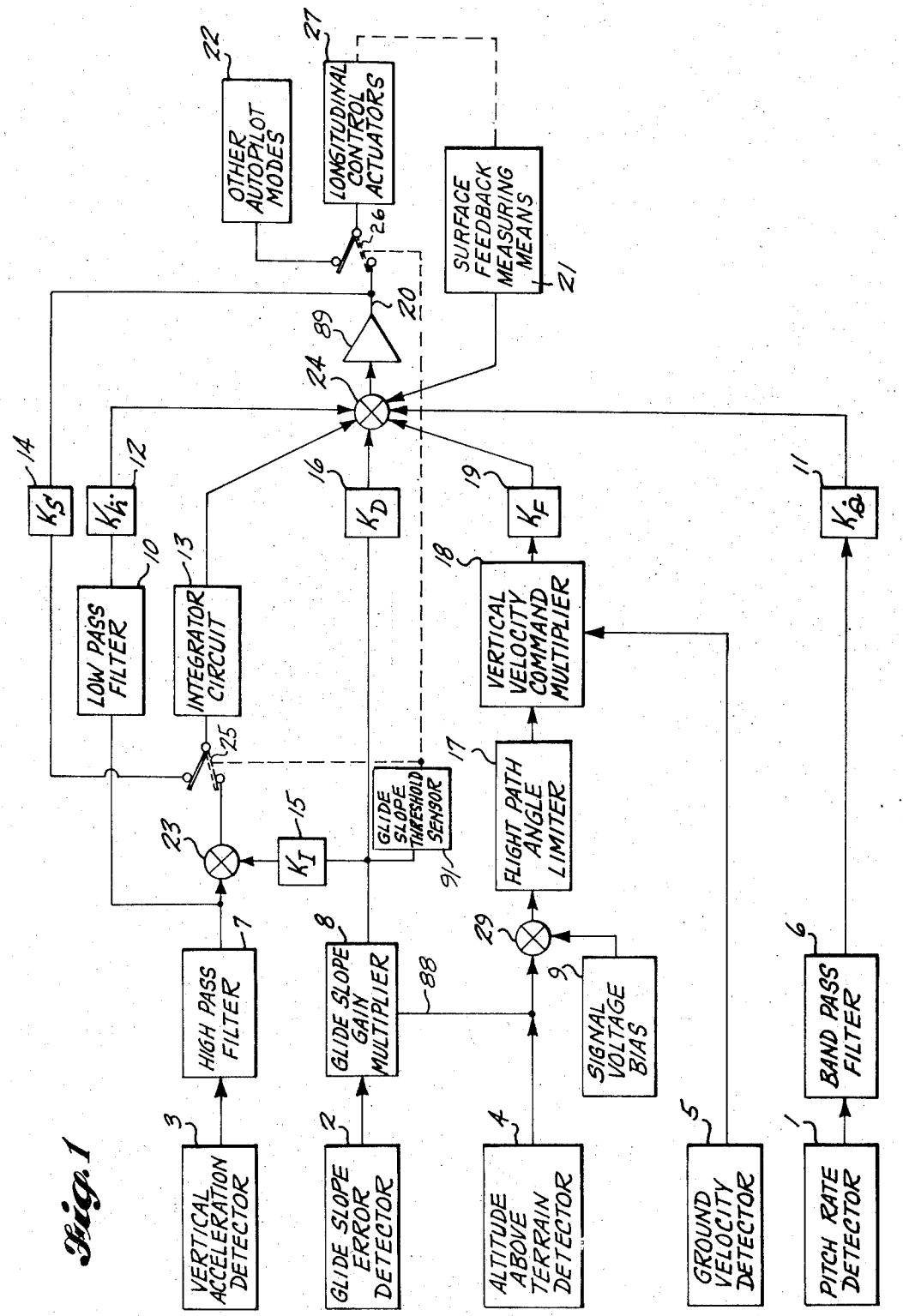
FIG. 1 is a block diagram of a pitch axis control system in accordance with a preferred embodiment of the invention.

Turning now to FIG. 1, there is shown a system embodiment of the present control system having several features which provide the several functions including, e.g., glide slope control, flare out, etc. In the system of FIG. 1, a negative feedback loop is coupled between the system output terminal 20 and system summing junction 24. This negative feedback loop is provided by the circuit path comprising the series connection of integrator circuit means 13, switching means 25 (comprising a switch shown closed in the solid line position) and summing resistor means 14 (represented as having the gain $K_s$). The aforementioned series circuit provides a synchronizing path through summing resistor means 14. This synchronizing path when operating in the synchronizing mode (with switching means 25 closed in the solid line position as shown) provides a means for reducing signals at system output terminal 20 to reference potential (zero) since the output signal voltage of integrator circuit means 13 connected as shown in series circuit become substantially becomes in magnitude and opposite in polarity to the sum of the other signal voltages coupled to system summing junction 24. In this manner, means are provided for maintaining the pitch axis control signals at control system output terminal 20 substantially at reference potential for eliminating undesired aircraft maneuvers upon initiation of automatic approach and landing computing functions in the present pitch axis control system.

Figure 2:
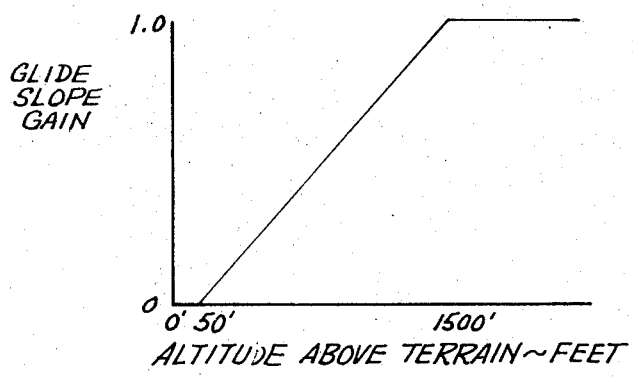
FIG. 2 is a graph representative of glide slope gain programming as a function of altitude above terrain in the system of FIG. 1.
Figure 3:
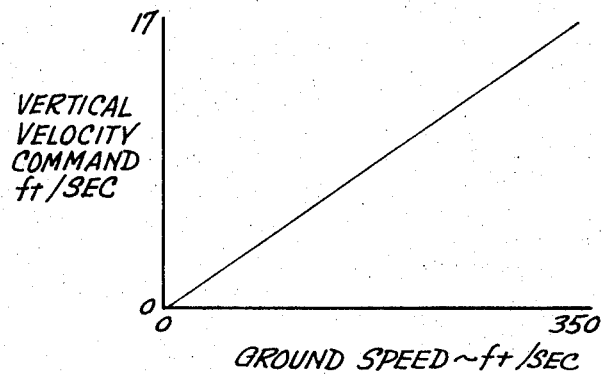
FIG. 3 is a graph illustrative of the amplitude of signals representative of vertical velocity command as a function of signals representative of ground velocity and flight path angle limiter output.

The aforementioned synchronizing path comprises a means for providing signal inputs representative of glide slope acquisition initial conditions in the present automatic approach and landing pitch axis control system thereby enabling maneuver of the aircraft onto the radio defined glide slope zero plane upon engagement of switching means 25 and 26 to provide closed circuit path through the dotted line positions. The present system is thereby conditioned for glide slope zero plane acquisition without utilization of further signal generating means however by utilizing the same system control laws to develop signals representative of the initial conditions which are utilized to the system development of pitch axis control signals for glide slope zero plane tracking. Integrator circuit 13 provides a means for storing at the output thereof a signal equal in magnitude and opposite in polarity to the sum of other signal voltages coupled to the input of system summing junction 24. Thus, for a glide slope acquisition by the aircraft positioned above or below the glide slope zero plane, the stored signal includes a signal which is equal and of opposite polarity to a signal representative of a fly-down or fly-up command respectively coupled as an input signal voltage to system summing junction 24 through the series circuit path comprising glide slope error detector 2, variable gain multiplier circuit 8, summing resistor circuit 16, and system summing junction 24. Variable gain multiplier circuit 8 comprises any of the types known in the art for multiplying two variable amplitude level signals together and having the gain thereof however varying in the manner shown in the graph of FIG. 2. Switching means 25 and 26 provide closed circuit paths through the positions having the dotted line connections shown at a predetermined level of error signal detected by glide slope threshold sensor 91 from the level representative of glide slope zero plane thereby decoupling the pitch axis control signal at system output signal 20 from the input of integrator circuit 13 and coupling the input of integrator circuit 13 to the output of summing junction 23 and further coupling system output terminal 20 to the longitudinal control actuators 27. The above mentioned switching causes decoupling of the synchronizing path from the control system so that the signal level at the output of integrator circuit 13 remains constant thereby preventing control of pitch axis control signals at system output terminal 20 to reference potential by these output signals from integrator circuit 13 due to variation in the other input signals coupled to system summing junction 24. As the aircraft continues to fly toward the glide slope zero plane, the fly-down or fly-up error signal from error detector 2 coupled in series circuit path with gain multiplier circuit 8 and summing resistor circuit 16 (represented as shown having a gain $K_D$) to an input of system summing junction 24 is reduced in amplitude thereby generating an error signal at system output terminal 20 in a fly-up or fly-down command direction respectively. The pitch axis control signal representative of fly-down command (considering the case of below the glide slope zero plane acquisition maneuver here for illustration) at system output terminal 20 comprises a stored signal representative of fly-down command coupled from the output of integrator circuit 13 and a decreasing amplitude signal representative of fly-up command coupled from glide slope error detector 2. The pitch axis control signal at system output terminal 20 representative of fly-down error command causes the longitudinal control actuator means 27 to displace the aircraft control surfaces in a manner causing the aircraft to descend. The aforementioned displacement of aircraft control surfaces results in nulling of the pitch axis control signal at system output terminal 20 since surface feedback measuring means 21 are coupled in feedback path from the aircraft control surfaces (actuated by longitudinal control actuators 27) back to system output terminal 20 by coupling through system summing junction 24 and amplifier circuit 89.

Since the input of integrator circuit 13 is coupled to vertical acceleration detector 3 by a series circuit path including high pass filter 7 and summing junction 23, the level of the output signal from integrator circuit 13 will vary as a function of the integral of the signal representative of vertical acceleration at the output of vertical acceleration detector 3 represented by the following mathematical equation:

$$\Delta \dot{h} = \ddot{h} [\tau s/(\tau s+1)][1/s] = \ddot{h}[\tau/(\tau s+1)] \doteq \ddot{h}[\tau/\tau s]$$
$$= \dot{h}/s$$

where S is the Laplace operator, $\ddot{h}$ is the vertical acceleration sensed by vertical acceleration detector 3 and $\Delta \dot{h}$ is the change in vertical velocity at the output of integrator circuit 13. $\tau$ is chosen such that the response of the system is more rapid than the washout time constant to allow suitable short term stability. The effect of this is that for high frequency components, the transfer function $F_{(S)}$ of the circuitry producing the output 7 acts as a high pass filter, i.e., $F_{(S)}$ tends to 1 as S tends to infinity, while rejecting low frequency components, i.e., $F_{(S)}$ tends to zero as S tends to zero. This allows the elimination of any bias or steady state null errors produced by vertical acceleration detector 3 prior to actuation of the present pitch axis control system by switches 25 and 26. After activation of switch 25, the output of high pass circuit means 7 is integrated by integrator circuit means 13 to produce a signal 96 ($\Delta \dot{h}$) at the output of integrator circuit means 13 which is representative of the change in vertical velocity of the system. The output signal from integrator circuit 13 is representative of change in aircraft vertical velocity and is coupled through the series circuit path shown comprising summing junction 23, switching means 25, integrator circuit 13 to system summing junction 24 to continuously null the error signal produced in the system by the decreasing glide slope signal. In this unique manner the signal representative of aircraft change in vertical velocity is provided in this system for coupling to system summing junction 24 by integration of the signal representative of vertical acceleration and not by signal processing of barometric vertical velocity signals. Further damping signal components included herein in signal processing to provide the pitch axis control signals at system output terminal 20 are provided for maintaining aircraft short period stability by: a series circuit path coupled between the output of high pass filter circuit 7 and system summing junction 24 including low pass filter circuit 10 and further including summing resistor circuit 12 (represented as having a gain $Kh$); and a series circuit path coupled from the output of pitch rate detector 1 to system summing junction 24 and including band pass filter 6 and further including summing resistor circuit 11 (shown as having a gain $K_\ominus$).

The results of the above discussed method and apparatus for acquiring by the aircraft the glide slope zero plane is a pitch axis control signal voltage representative of a fly-down (or fly-up if approaching from above the glide slope zero plane) change in vertical velocity command having an amplitude proportional to the error between the signal voltage representative of glide slope error at the output of integrator circuit 13 and the error signal voltage generated by error detector 2.

The above described pitch axis control system provides pitch axis control signals at system output terminal 20 representative of flight path commands for positioning the aircraft on a flight path for exponentially acquiring the glide slope zero plane. It should be further noted that switching means 25 (when actuated to the position to complete the path represented by the dotted line) provides a means for coupling in series circuit path, glide slope gain multiplier circuit 8 between glide slope error detector circuit 2 and summing junction 23 thereby providing means for varying the signal representative of change in vertical velocity present at the output of integrator circuit 13 during the aircraft glide slope acquisition maneuver and subsequent glide slope zero plane tracking to thereby eliminate errors developed in the pitch axis control signals representative of flight path commands at system output terminal 20, and cause the aircraft to acquire and track the zero plane of the signal representative of glide slope error. The integrator circuit 13 output signal voltage during this time period of glide slope acquisition maneuver and subsequent zero plane tracking is proportional to and of opposite polarity to the vertical velocity command multiplier circuit 18 output signal voltage which relationship is required to maintain the amplitude of the signal voltage representative of glide slope error present at the output of glide slope error detector 2 substantially equal to zero.

The output signal voltage from multiplier circuit 18 is representative of the aircraft vertical velocity required to maintain a flight path along the glide slope zero plane and flare the aircraft onto the runway for landing. This unique signal developed in the below mentioned novel manner provides the following two important primary functions in the present system, viz., (1) a means for maintaining the aircraft position on the glide slope zero plane during changes in aircraft ground velocity (due to wind or an actual slowing down of the aircraft prior to landing) by varying the commanded system vertical velocity as a function of ground velocity thereby providing means for change in the vertical velocity reference of the aircraft without causing maneuver off of the glide slope zero plane and, (2) a means for providing pitch axis control signals representative of flare command maneuver by providing an output signal voltage from multiplier circuit 18 representative of a decreasing vertical velocity command as the aircraft approaches the landing runway.

Since the vertical velocity required to maintain an aircraft on the glide slope zero plane is determined by the angle between the glide slope zero plane and the ground and further by the velocity of the aircraft with respect to the ground, and since the above described angle of the glide slope zero plane is limited to the range 2.5 to 3.0° (under normal conditions), a signal representative of required vertical velocity is generated at the output of vertical velocity command multiplier circuit 18 by multiplying in the circuit a signal representative of the aircraft ground velocity generated by ground velocity detector circuit 5 by a voltage, viz., the output voltage from flight path angle command limiter circuit 17 representative of the glide slope zero plane angle. Means are provided comprising summing resistor circuit 19 for coupling the output of multiplier circuit 18 to system summing junction 24 which signal input to system summing junction 24 is nulled by a signal voltage of equal amplitude but opposite polarity input to system summing junction 24 from the output of integrator circuit 13 prior to glide slope acquisition. If during the approach, the aircraft changes ground velocity due to wind variation, lowering of flaps, etc., the output signal from velocity detector circuit 5 will cause a change in the output voltage of vertical velocity command multiplier circuit 18 thereby developing an error signal at system output terminal 20 causing aircraft acceleration in an upward or downward direction to maintain the glide slope zero plane and integrator circuit 13 will cause integration of the signal voltage representative of the resultant vertical acceleration and provide an input signal voltage to system summing junction 24 for nulling the aforementioned error signal developed at system output terminal 20. In this manner, means are provided in the system for maintaining the aircraft on the glide slope zero plane during changes in aircraft velocity.

Figure 4:
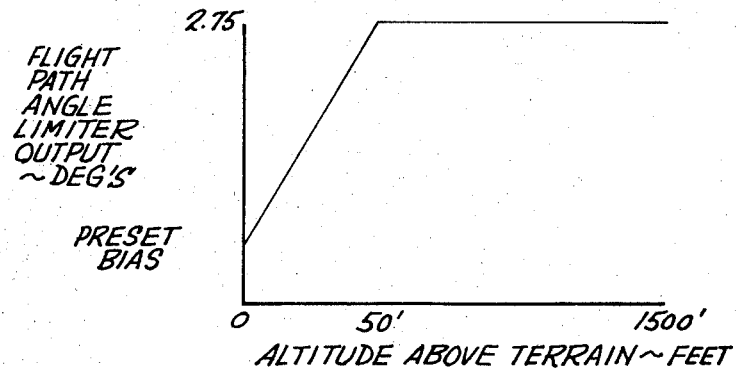
FIG. 4 is a graph illustrative of signals representative of flight path angle limiter output as a function of altitude above terrain.

Since the signal voltage provided at the output of flight path angle limiter circuit 17 is representative of desired glide slope zero plane angle or desired aircraft flight path angle, further novel signal processing was provided in the present system for utilizing this signal voltage in a unique manner, viz., for the purpose of providing the flare maneuver of the aircraft onto the runway. The signal voltage available at the output of limiter circuit 17 (shown in FIG. 4) is obtained by limiting the output signal voltage from altitude above terrain detector 4 to an amplitude representative of desired flare initiation altitude, so that when the output signal voltage from altitude above terrain detector circuit 4 is representative of an altitude above the altitude at which amplitude limiting is provided by limiter circuit 17, a pitch axis control signal at the output of limiter circuit 17 representative of a constant flight path angle command is provided. As the aircraft descends to an altitude represented by a signal voltage from altitude above terrain detector circuit 4 equal to the predetermined altitude represented by the limiting voltage output of limiter circuit 17, glide slope gain multiplier circuit 8 is programmed to zero gain by coupling of a gain control signal voltage 88 to multiplier circuit 8 from the series circuit path including altitude above terrain detector circuit 4 which programming to zero gain of multiplier circuit 8 provides a means for decoupling glide slope error detector circuit 2 from the system and the output signal voltage amplitude of flight path angle limiter circuit 17 begins to decrease in proportion to the signal voltage output of altitude above terrain detector circuit 4 since now decreasing below the limiting circuit 17 threshold. Now, since the output signal voltage from flight path angle limiter circuit 17 is proportional to desired flight path angle and therefore also desired aircraft vertical velocity, a decreasing output signal voltage from flight path angle limiter circuit 17 provides a decreasing aircraft flight path angle command and a resultant signal representative of decreasing vertical velocity command is generated at the output of vertical velocity command multiplier circuit 18. A bias signal voltage provided by source 9 is coupled to summing junction 29 also with the altitude above terrain detector 4 circuit output signal voltage as a means for providing a positive touchdown command by the pitch axis control signals at system output terminal 20 when the altitude above the runway (signal voltage from detector circuit 4) is reduced to zero. In this unique manner, the flare-out maneuver of the aircraft is accomplished without additional switching means in the system but by utilizing signal sources already known to be operative since already being utilized in system signal processing earlier in time.

The attendant advantages of the present system which provides a means for varying the vertical velocity command during speed changes without the requirement of generation of a glide slope zero plane error, further provides means for generating feedback signal components which are functions of vertical velocity without utilization of barometric vertical velocity sensing means for providing an input signal in the system and in addition includes features which provide flare-out and landing maneuvers without utilization of a new control law for such additional maneuvers.

What is claimed is:

1. In combination in a pitch axis control system for an aircraft:
   glide slope error detector means;
   altitude above terrain detector means;
   first multiplier circuit means coupled to said glide slope error detector means and said altitude above terrain detector means for providing a first signal representative of actual flight path error of the aircraft;
   acceleration detector means;
   high pass filter circuit means coupled to said acceleration detector means;
   integrator circuit means responsive to said multiplier circuit means and said high pass filter circuit means for providing a second signal representative of the change in vertical velocity of the aircraft;
   ground velocity detector means;
   second multiplier circuit means coupled to said ground velocity detector means and said altitude above terrain detector means for providing a signal representative of commanded vertical velocity; and, means responsive to said first multiplier circuit means, said integrator circuit means, and said second multiplier circuit means for providing a signal representative of vertical velocity error.

2. In combination in a pitch axis control system for providing a signal representative of vertical velocity error at an output terminal for positioning an aircraft on a flight path to exponentially flare out onto a landing runway:
   acceleration detector means;
   high pass filter circuit means coupled to said acceleration detector means;
   integrator circuit means coupled to said pass filter circuit means for providing a first signal representative of the change in vertical velocity of said aircraft;
   altitude above terrain detector means;
   limiter circuit means coupled to said altitude above terrain detector means for providing a second signal representative of the desired flight path angle of said aircraft;
   ground velocity detector means;
   multiplier circuit means responsive to said second signal and coupled to said ground velocity detector means for providing a third signal representative of desired vertical velocity of said aircraft; and,
   means responsive to said integrator circuit means and said multiplier circuit means for providing a signal voltage representative of vertical velocity error.

3. A pitch axis control system for providing a signal representative of a flight path command at the system output terminal thereof comprising in combination:
   glide slope error detector means;
   glide slope gain multiplier circuit means;
   first adder circuit means;
   amplifier circuit means;
   said glide slope gain multiplier circuit means and said first adder circuit means coupled between said glide slope error detector means and the input terminal of said amplifier means, the output terminal of said amplifier means coupled to said system output terminal;
   control surface feedback measuring means coupled between the control surfaces and said first adder circuit means;
   second adder circuit means coupled to said glide slope gain multiplier circuit means;
   integrator circuit means;
   said integrator circuit means input coupled to said second adder circuit means and said integrator circuit means output coupled to said first adder circuit means;
   vertical acceleration detector means;
   high pass filter circuit means;
   said high pass filter circuit means coupled between said vertical acceleration detector means and said second adder circuit means;
   ground velocity detector means;
   vertical velocity command multiplier circuit means;
   altitude above terrain detector means;
   flight path angle command signal generating means including limiter circuit means coupled between said altitude above terrain detector means and said vertical velocity command multiplier circuit means; and
   said vertical velocity command multiplier circuit means coupled between said ground velocity detector circuit means and said first adder circuit means.

4. The invention according to claim 3 further comprising low pass filter circuit means coupled between said high pass filter circuit means and said first adder circuit.

5. The invention according to claim 4 further comprising pitch rate detector means and band pass filter circuit means coupled in series circuit path with said first adder circuit.

6. An aircraft pitch axis control system for providing pitch axis control signals at the system output terminal thereof comprising in combination:
   first circuit means for providing a first signal representative of vertical acceleration of said aircraft;
   high pass filter circuit means responsive to said first signal for providing a second signal;
   second circuit means for combining a plurality of input signals at the input terminals thereof and providing an output signal at an output terminal thereof;
   third circuit means for providing a third signal representative of glide slope error of said aircraft;
   first gain controlled amplifier circuit means responsive to said third circuit means for providing a fourth signal, and means for coupling said second and fourth signals respectively to said input terminals of said second circuit means;
   third circuit means for combining a plurality of input signals at the input terminals thereof and providing an output signal at an output terminal thereof, and means for coupling said output terminal to said system output terminal;
   fourth circuit means for coupling said fourth signal to a first of said plurality of input terminals of said third circuit means;
   a first series circuit path including low pass filter circuit means responsive to said second signal and coupled to a second of said plurality of input terminals of said third circuit means;
   fifth circuit means for providing a fifth signal representative of altitude above terrain of said aircraft;
   a limiter circuit;
   second gain controlled amplifier circuit means;
   sixth circuit means for combining a plurality of input signals including said fifth signal and a bias voltage at respective input terminals thereof and providing an output signal at an output terminal thereof, and means for coupling said output terminal, said limiter circuit and said second gain controlled amplifier circuit means in series circuit path with a third of said plurality of input terminals of said third circuit means;
   seventh circuit means for providing a sixth signal representative of ground velocity of said aircraft, said fifth and seventh signals coupled respectively to said first and second gain controlled amplifiers for controlling the respective gains thereof;
   eighth circuit means for providing a seventh signal representative of pitch rate of said aircraft;
   means including band pass filter circuit means coupled between said eighth circuit means and a fourth of said plurality of input terminals of said third circuit means;
   integrator circuit means having an input terminal and an output terminal, said output terminal coupled to a fifth of said plurality of input terminals of said third circuit means;

switching means for coupling said input terminal of said integrator circuit to said output terminal of said second circuit means or completing a series circuit path including amplifier circuit means to said system output terminal.

* * * * *